Patented Aug. 31, 1937

2,091,629

UNITED STATES PATENT OFFICE 2,091,629

METHOD OF TREATING WHEY

Forest H. Clickner, Chicago, Ill., assignor to Kraft-Phenix Cheese Corporation, Chicago, Ill., a corporation of Delaware No Drawing. Application December 28, 1933, Serial No. 704,331

9 Claims. (Cl. 99—57)

My invention has to do with an improved method for recovering milk solids from the serum resulting after casein has been isolated from milk, particularly according to the process of Arthur S. Ambrose set forth in his co-pending application, Serial No. 660,464, filed March 13, 1933, patented February 12, 1935, No. 1,991,189, and like methods.

According to said Ambrose method, briefly stated, casein is isolated from milk by treating the latter with a gum such as locust bean gum, gum tragacanth or gum karaya. A dilute solution of the gum is added to the milk, the mixture is brought to a temperature sufficient to precipitate the casein but insufficient to modify the chemical or physical nature thereof as a suspensoid colloid, and the precipitated casein thus obtained is then separated from the supernatant liquor by decantation, filtration, or like methods.

The gum in such a process remains almost entirely in the whey liquor, and while such liquor is intrinsically very valuable in its high content of lactose, lactalbumin, and mineral salts, it is found that it is not readily susceptible to known methods of drying whey because of technical difficulties introduced by the presence of the gum. This will be understood when it is considered that, whereas cheese whey usually has a viscosity of 32–34 seconds (pipette method), the gum-containing whey has a viscosity of about 65 seconds. Such gum cannot be readily filtered off because it tends to clog the pores of the filter.

In accordance with my invention, the gum is permitted to remain in the whey but is treated with a solubilizing enzyme, so that the gum so solubilized will go completely into solution in the whey, the resultant liquid having a viscosity substantially no higher than that of ordinary whey. Such material may then be treated in the same manner as ordinary whey to recover the solids therefrom.

I have found that organisms of the aspergillus group function satisfactorily to solubilize the gum. I prefer to use the Oryzae type, as it has no bad effect upon the final product.

Example.—In the practice of my invention I preferably add to whey containing gum, as obtained from the Ambrose or like processes, about one per cent by weight of a ten per cent solution of aspergillus Oryzae, said fungus having a potency of about 175 Lintner units. I prefer to use a fungus which has been grown on a high-protein culture—a wheat bran culture has been found satisfactory. The fungus extract is added to the liquor and the mixture is kept at a temperature of about 98° F. for approximately three hours.

After such treatment, it is found that the gum has completely dispersed in the serum, which has attained a viscosity of approximately 34 seconds. It will thus be seen that, as a result of my improved process, this highly viscous material, which heretofore has been incapable of industrial utilization, may now easily and inexpensively be converted to a valuable article of commerce.

The low viscosity liquid obtained by my process as above described may be subjected to any satisfactory method for drying whey. For example, the material may be dried by the method described in Simmons Patent No. 1,763,633, dated June 10, 1930, whereby the liquid is evaporated in vacuo to a point where it will set upon cooling to form a semi-solid mass, said mass being then sub-divided and the drying completed at low temperatures in a drying tunnel. Or, if desired, the whey may be dried in accordance with the process of the Eldredge Patent No. 1,923,427, dated August 22, 1933, whereby it is sprayed to form a substantially anhydrous powder; a calculated quantity of water is then added substantially equal to or slightly more than the water of crystallization of the lactose present, thus forming a hard cake with the lactose in hydrated condition, after which the cake is ground to a powder. Under either process a substantially anhydrous and stable whey powder is obtained.

Various changes and modifications of my process will doubtless suggest themselves to those skilled in the art. Hence, I do not wish to be limited to the specific details disclosed herein. The scope of my invention is to be determined from the appended claims, which are to be interpreted as broadly as the state of the art will permit.

I am familiar with the work which has been done in connection with various aspergilli, including aspergillus Oryzae, notably by the Japanese biochemist, Takamine, including the utilization of these organisms for the digestion of various materials. However, so far as I am aware, this class of organisms has not heretofore been suggested for the purpose outlined above.

I claim as my invention:

1. A method of treating whey containing locust bean gum, comprising subjecting said material to the action of an enzymatic substance capable of solubilizing said gum until the viscosity of the mixture has been substantially reduced.

2. A method of treating whey containing locust bean gum suspended therein, comprising subjecting said material to the action of aspergillus Oryzae to solubilize the gum and substantially reduce the viscosity of the mixture.

3. A method of treating whey containing locust bean gum in suspension and having a relatively high viscosity, comprising adding thereto an extract of aspergillus Oryzae and after the viscosity of the mixture has been substantially reduced by action of the enzyme on the gum, concentrating said whey.

4. A method as defined in claim 2, wherein the aspergillus Oryzae has been cultured on wheat bran.

5. A method of treating a whey serum containing locust bean gum in suspension therein, comprising adding thereto an extract of aspergillus Oryzae which has been cultured on wheat bran, and maintaining the material at about 98° F. until it has attained a viscosity not substantially higher than 34 seconds by the pipette method.

6. A method of treating whey containing locust bean gum, comprising subjecting the locust bean gum to the action of an enzymatic substance capable of solubilizing said gum until the viscosity of the mixture has been substantially reduced, and then eliminating the major water content to produce a stable, non-hygroscopic solid.

7. A method as defined in claim 2, wherein the aspergillus Oryzae has been cultured on high-protein vegetable material.

8. A method of reducing the viscosity of whey which is a residue from a process of casein precipitation by the addition to milk of locust bean gum which remains dispersed in said whey, said method comprising subjecting said whey to the action of an enzymatic substance capable of solubilizing said gum.

9. A method of preparing whey for drying which comprises treating whey, which is a residue from a process of casein precipitation by the addition to milk of locust bean gum which remains dispersed in said whey, with aspergillus Oryzae until said gum is solubilized and the viscosity of the whey has been substantially reduced.

FOREST H. CLICKNER.